United States Patent Office

3,239,461
Patented Mar. 8, 1966

3,239,461
ION FLOTATION METHOD
Felix Sebba, University of the Witwatersrand, Milner Park, Johannesburg, Transvaal, Republic of South Africa
No Drawing. Filed Dec. 29, 1959, Ser. No. 862,482
3 Claims. (Cl. 210—44)

My invention relates to the recovery of ions from solution and more particularly to the recovery of non-protein organic ions from solution by contacting the ions with an ionic organic reagent to form insoluble reaction product and separating insoluble reaction product from the solution.

For many years flotation procedures have been used to recover various particles from suspension. Generally the flotation process consists of contacting the finely ground mixtures of particles with flotation agents and other additives; contacting the treated particles with air bubbles to buoy or lift the particles to the surface and recovering the metal from the resulting froth.

I have now discovered a recovery process where I can recover ions from solutions in the complete absence of undissolved particles, as differentiated from ions, such as are recovered by the usual flotation processes, and ions from particle separation waters wherein the amount of solid particles is so reduced that the amount of insoluble reaction product resulting from combination of organic ions with the collector comprises as least 5% and preferably at least 15% of the recovered product. I further prefer that the process be carried out in the absence of undissolved organic particles, through their presence is not detrimental.

Generally my process consists of concurrently contacting organic cations or anions in solution together with organic particles, if present, with bubbles and with anionic and cationic reagents, i.e. collectors, respectively to form insoluble products which are transported to the solvent surface by the rising bubbles and removed therefrom as a froth or scum.

Ions which can be recovered by my process are organic non-protein ions which can be collected without deleterious effect on the ion being recovered, i.e., the original material can be recovered, or readily regenerated, once the collector ion is separated from the ion being recovered. These ions are formed from non-protein organic compounds containing ionizable substituents such as hydroxyl, carboxyl, sulfonyl, sulphonium, arsonium, oxonium, phosphonium, quaternary nitrogen, amino, mercapto, arsono, nitro, hydrazine, hydrazide, carbazide, pyridyl, piperidynl, phosphonyl and oxime radials. A few of the many compounds which can be ionized and therefore collectable by my process include abietic acid,
ethanthionamide,
p-dimethylaminoacetanilide,
2,4-dinitroacetanilide,
acetylacetone,
acetaldoxime,
acetic acid,
phenylacetic acid,
sulfoethanoic acid,
2-acetyl-4-bromo-1-naphthol,
acetonitrolic acid,
acetylenedicarboxylic acid,
adipic acid,
adrenaline,
alanine,
arginine,
tryptophan,
alizarin,
allanturic acid,
alloxanic acid,
barbituric acid,
5-benzamino-8-ethoxy quinoline,
N-phenyldibutylamine,
o-nitroaniline,
2,4,6-trinitroaniline,
o-anilinsulfonic acid,
o-nitrobenzoic acid,
1-methoxy-2-nitrobenzene,
o-ethylaminobenzoic acid,
2-amino-1-hydroxy-anthraquinone,
ascorbic acid,
p-aminobenzenearsonic acid,
azobenzenedicarboxylic acid,
dimethylphosphinic acid,
p-cyanobenzoic acid,
benzenephosphonic acid,
p-benzophosphinic acid,
o-sulfamidobenzoic acid,
diethyl sulfoxide,
benzenecarbothioic acid,
bis-m-aminophenyl ketone,
2,4,5-pyridinetricarboxylic acid,
triethylbismuthine, biuret,
ethaneboronic acid,
benzeneboronic acid,
nitromethane,
α-isonitroso butyric acid,
dimethylarsenic trichloride,
nitrourethan,
diethylphosphoric acid,
bis(dibutylthiocarbamyl) disulfide,
eosin,
ephedrine,
N-ethylbenzalimine,
D-gluconic acid,
isocinchomeronic acid,
isothiocyanic acid,
acetamidine,
kojic acid,
actithiazic acid,
actinomycin,
agrocybin,
amicetin,
the bacitracins,
D-4-amino-3-isoxazolidone,
3-hydroxy-2-butanone glycerol,
alkyl sulfide,
gramcidin,
the tetracyclines,
chloramphenicol, erythromycin,
5-n-butylpyridine-2-carboxylic acid,
streptomycin,
the pencillins,
tyrocidine and picric acid.

The collectors utilized in the process of my invention are, generally speaking, the ionic surface-active collectors which are utilized in ore flotation procedures. These collectors must have at least one hydrophilic center of activity and at least one aerophilic (gas avid) center of activity. They must have an electrical charge which is opposite to the ion which it is desired to collect if the process is to be operative.

A surface-active anionic collector; i.e. a collector yielding, in aqueous solution, a surface active ion bearing a negative charge, for example, a lauric acid soap; is used to remove a soluble cation from solution. Conversely, a surface-active cationic collector; i.e. a collector yielding, in aqueous solution, a surface-active ion bearing a positive charge, for example lauryl pyridinium chloride; is used when it is desired to remove a desired anion from solution.

Cationic collectors used in my novel process, for the most part, are compounds having an amine nitrogen. These compounds include alkylaryl- and arylalkyl-amines and the corresponding amine salts and quaternary ammonium halogen salts. The arylamines include the picolines, pyridines, quinolines and their homologs and lower alkyl substituted analogs.

Examples of cationic collectors which will react with organic anions in polar solutions include the quaternary ammonium compounds such as trimethyl-n-octylammonium chloride, trimethyl-n-decylammonium chloride, trimethyl-n-dodecylammonium chloride, trimethyl-n-octadecylammonium bromide, triethyl-n-hexadecylammonium iodide; mixtures of quaternary salts derived from tallow fatty acids, from cottonseed oil fatty acids, from soybean oil fatty acids and coconut oil fatty acids, from mixtures of atty acids derived from tallow, corn oil, soybean oil, coconut oil; alkyl amines such as diamylamine, didoceylamine, n-decylamine, n-tetradecylamine, tri-n-octaecylamine, n- octadecylamine and mixtures of amines; and miscellaneous collectors such as ammonium phenylnitrosohydroxylamine, 1-n-dodecylpyridinium iodide, octadecyl $\beta$-hydroxyethyl morpholinium bromide, $\beta$-stearamidophenyl trimethylammonium methylsulfate, octadecyl pyridinium iodide, octadecyl $\alpha$-picolinium bromide, hexadecyl quinolinium bromide, decylstyrylpyridinium chloride, dodecylpyridinium phenylsulfonate, dimethyldodecyl-phenylammonium phenylsulfonate, 2-mercaptobenzothiazole derivatives, various imidazoline and imidazolidine derivatives and dimethyl-n-hexadecylbenzylammonium chloride.

Anionic collectors are of two types: the oxhydryl compounds, where a metal or hydrogen is connected to the hydrocarbon element of the collector through an oxygen atom, and the sulfhydryl type where the connection is made through a sulfur atom. The oxhydryl collectors include carboxylates, acid alkylsulfates, sulfonates and phosphates and phosphonates. The sulfhydryl compounds include mercaptans, thiocarbonates (xanthates), thioureas and dithiophosphates. Examples of anionic collectors include the acids and sodium, potassium or ammonium salts of rosin, the tall oils and animal and vegetable oils; naphthenic acids; sodium-n-octylsulfate; potassium-n-dodecylsulfate; the ammonium salt of n-dodecyldiethyleneglycosulfate; the sodium salt of crude or refined petroleum sulfonic acid; $\beta$-phenylpropionic acid; pelargonic acid; mixtures of acids derived from linseed oil, soybean oil, palm oil, corn oil and cottonseed oil; monosodium $\alpha$-sulfopalmitate; disodium $\alpha$-sulfostearate, 1,3-diphenyl-2-thiourea and thiocarbanilide. The above-described examples of cationic and anionic collectors are but a few of the many collectors which are known to be commercially practicable and which are used in flotation procedures.

The number of carbon atoms in the aerophilic portion or portions of the collector molecule required to impart desired aerophilic properties to the collector varies with the type of collector. Generally from 5 to about 24 and preferably from 8 to 22 carbon atoms are required in at least one aerophilic portion of the collector molecule. My preferred cationic and anionic collectors are derived from plant and animal triglycerides, preferably vegetable or marine animal triglycerides. These glycerides can be hydrolyzed to free their fatty acids which can then be utilized as anionic collectors per se, or which can be converted to ammonium or alkali metal salts for similar purposes. When a cationic collector is desired, the fatty acids are converted to amines, nitriles or quarternary salts by known means. It is also preferred that hydrocarbon chains of these collectors contain carbon to carbon unsaturation. Where quarternary ammonium collectors, diamine collectors or triamine collectors are utilized, it is especially preferred that the collectors contain at least 1- hydrocarbon radical containing from 8-22 carbon atoms.

The term "insoluble reaction products" and similar terms are used throughout my specification. The term insoluble does not mean that the "solubility" is an equilibrium between the ions in solution and a solid ionic crystal, rather it is intended that the term encompasses instances wherein the reaction product is composed of oppositely charged ions which are not independent as they have lost some entropy. Thus, the term applies to products absorbed at the solvent-bubble interface, i.e. the unitary product molecules are no longer randomly dispersed throughout the solution but are, in a major proportion, localized at the solvent-bubble interface. The products at the interface may be thought of as crystals containing only one molecule of product. As these crystals are forced closer together in the draining froth, they form a scum which is highly insoluble rather than larger crystals.

The insolubility of the reaction products, insolubility being defined in terms of the preceding paragraph, formed in my process determines, to some extent, the efficiency of the process. A very high percentage of the total ion content can be rapidly removed from solution if the reaction product is highly insoluble, i.e. forms a scum more rapidly than less insoluble products, while more soluble reaction products can only be removed to the extent that they are absorbed and removed in the froth.

The rate of collection of the ions in solution can often be visually determined as the ionic solutions often change colors as the ions are removed. Thus, solutions containing colored indicator ions such as pink phenolphthalein ions in basic solution, pink methyl orange ions in acid solution and yellow ions in basic solution become progressively more clear and finally water white as the ions are removed.

As previously indicated, the pH of the solutions determines, to some extent, the operability of the process. This is because organic ions are soluble to a varying extent in any solution. This fact has been known for years and chemical separation and qualitative analytical procedures are often based on this physical phenomenon. This phenomenon can also be utilized to separate one ion from others in solution where the solubilities vary to some extent at a particular pH.

To be useful in my process the ion solvent, or solvent system, must dissolve the ion to be concentrated and the collector ion and must be polar to the extent that the organic material to be collected and collectors ionize sufficiently for the ion to be collected to interact with the collector ion of opposite charge to form a reaction product which is insoluble in the solvent and bubble medium. Solvents which I have found to be useful in my process include water, anhydrous liquid ammonia, anhydrous lower alkyl amines, lower nitroalkanes, anhydrous lower aliphatic alcohols and acids, lower liquid alkyl chlorides such as methylene chloride and anhydrous lower aliphatic ketones and ethers and mixtures of these. I prefer to use water as a solvent in my process.

The concentration of the collector in the solvent is one of several variables which determines the efficiency of my process. Generally, collectors have soap-like qualities and tend to form micelles in the solution when their concentration is increased to what is called the critical micelle concentration. If micelles are present in the solution to any great extent, a colloidal solution or sol will be formed which will hold the ion to be removed in the solution. In such cases, it will not be possible for the rising bubbles to collect a large portion of the ions and the efficiency of my process will be considerably reduced.

The critical micelle concentration is thought to depend upon many variables such as the pH of the solution; the temperature of the solution, which should be below the melting point of the reaction product; the ionic strength of the solution and the age of the collector solution. Generally, the critical micelle concentration of collectors ranges from about 0.1 to about 0.001 mole in water solution. For example, the critical micelle concentration of potassium laurate in water is about 0.02 mole while the critical micelle concentration of potassium myristate in water is 0.006 mole. Translated into grams, a concentration of 1.5 grams per liter of potassium myristate or about 0.019 grams per liter of sodium cetyl sulfate in water would approach the critical micelle concentration.

If excessive collector is dissolved in the solvent and micelles form so that recovery is poor or the process totally inoperative, a very high dilution of the solution with additional solvent will sometimes slowly destroy the micelles and subsequently flotation may take place.

The age and prior history of the collector also affect the efficiency of my process. I can overcome this difficulty to some extent by formulating fresh solutions of collector ions in polar vehicles such as ethanol and propanol, in which the collector has a high critical micelle concentration and introducing the collector solution into the solvent from which the ion is to be recovered. Efficiency is further improved if a collector solution is formulated in a non-polar solvent, such as petroleum ether, ethyl acetate, or kerosene; the solvent removed; the collector dissolved in a polar solvent and the resulting solution immediately introduced into the solution from which the ions are to be collected.

The collector can also be introduced into the ion containing solution in the vapor phase. Thus, laurylamine can be entrained in steam and the steam sparged into the solution. Alternately, the collector could be entrained in an inert gas which would also serve as a bubble medium.

A solid collector containing a major portion of mono molecular collector can be formed by freeze drying foams to remove the water from the foams, crushing the foam and compacting the crushed foam to form a solid collector mass of desired shape.

As mentioned, I prefer to add dilute solutions of a collector in a polar solvent, having, when ionized, a charge opposite to the charge of the ion to be collected to a solution of organic ions to be collected at such a rate that substantially no micelle formation occurs and at a rate such that substantially all micelles in the added soap solution are broken up. As the collector is added to the solution, bubbles are passed through the mixture to carry the adsorbed molecules of reaction product to the surface of the solvent where they can be collected or removed by usual procedures.

The rate of collector addition is determined by, among other things, the concentration of the ion to be collected and the critical micelle concentration. Where the concentration of the ion to be collected is low, several equivalent portions of collector may be added to the solution to effect a rapid concentration of the ion to be recovered without exceeding the critical micelle concentration of the collector.

The amount of collector utilized in my process depends upon a number of factors including the number of reactive radicals on the collector molecules, the valence of the ion being collected and the pH of the solution.

The range of amounts of collector required to collect a given amount of ion is great. I prefer to utilize an amount of collector ranging from about 0.001 to 10 equivalents of collector/equivalent of ion. A still more preferable range of equivalents is 0.1–10 equivalents of collector/equivalent of ion. Still more preferable is the utilization of stoichiometrically equivalent amounts of collector/equivalent of ion to be collected.

The reaction products formed when the above-identified collectors are contacted are removed from solution of flotation, i.e. are removed from solution by means of substantially nonreactive gaseous bubbles. Useful bubble materials include gaseous hydrocarbons such as methane, ethane and butane; gaseous halogenated hydrocarbons such as the freons; and gases such as air, carbon dioxides, nitrogen and argon. I prefer to utilize air to remove insoluble reaction products from the solvents used in the ion recovery process of my invention.

In polar solutions, the collector ions apparently concentrate at the interface between the solvent and the interior of the bubble. For this reason, it is preferable to utilize the smallest possible bubbles and to have the longest possible bubble path to the surface in order to insure the greatest amount of ion collection possible. In small reactors it is possible to decrease the rate of bubble rise and thereby increase collection efficiency by imparting a counter-current movement to the solvent.

The volume of the bubble fluid is not critical and varies widely with the shape of the solvent container, the solvent and the average individual bubble diameter. However, care should be taken that the volume of the bubble fluid or the size of the bubble are not such that they will unduly disturb the surface of the solvent. As previously stated, the collector ions tend to congregate at the solvent bubble interface and rise to the surface with the bubbles. If the bubbles are lifted from the surface by following bubbles a froth is produced in which the insoluble reaction products tend to agglomerate. This froth is easily removed. However, if the bubbles are broken to any great extent by turbulence, a relatively high collector concentration will be present near the surface of the water in instances where an excess of collector is utilized in the process. This may cause the agglomerating collector molecules to form colloid solutions, thus preventing them from being recovered. It is also important to avoid undue tubulence at the surface of the solution because the forming scums decompose readily. However, once the scum is formed, it is relatively stable.

The rate of bubble flow can be controlled by decreasing the total bubble volume as the turbidity of the polar solvent at the surface of the solvent increases. If there is no turbidity near the surface of the polar solvent, colloidal solutions are not being formed and the flow rate of the bubble can be increased to a point just below the volume which tends to form turbid colloids near the surface of the fluid. The formation of turbid colloidal solutions reduces the efficiency of my process and is to be avoided. I prefer to maintain the surface of the liquid in a quiescent state; that is, a state of reduced turbulence where rising bubbles remain substantially intact when they break the surface of the liquid to the extent that no great amounts of colloidal solution is formed. The bubble flow rate, or total volume of bubble fluid, can, as indicated before, be adjusted by visual or mechanical determinations of the turbidity of the solutions.

The insoluble reaction products formed in my process can be removed from the surface of the liquid, as a scum or a scum on a froth depending whether excessive collector is utilized, by means of wipers which skim the insoluble reaction product from the liquid surface into a suitable collector. Alternately, an air current may be utilized to blow the scum bearing froth into a collector. The bubbles may also be collected by flowing a small amount of surface solvent over a weir and through filters to remove the floating froth. Means for removing froths and scums are well known in the ore flotation art and can be equally well applied to my process.

Once concentrated on the surface and removed, the insoluble reaction products can be handled in several ways, depending upon the cost of the recovered element realtive to the cost of the collector.

The recovered ion can be regenerated from the froth by any of the usual procedures. For example, the insoluble reaction product can be hydrolyzed in a solvent and the collector or material collected removed from solution by precipitation and filtration or solvent extraction. It is preferable to recover the collector in a solvent in which the critical micelle concentration is high, for example in a petroleum hydrocarbon or absolute lower aliphatic alcohols. If this latter procedure is carried out, the collector ion can be utilized readily for further collection without further treatment. If the collected ion is removed by precipitation or by countercurrent extraction and the collector left in aqueous solution or other solution where the critical micelle concentration is low, the collector must be converted to the monomolecular form required for my process by previously described procedures.

Water and air are used as the solvent and bubble medium in the preferred embodiment of my invention. I will further discuss my invention in relationship to this preferred embodiment though my remarks are generally applicable to all embodiments of my invention.

The efficiency and selectivity of my process is determined by many variables including the concentration and ionic strength of the collector, the quiescence of the surface of the solvent or bubble medium, the solubility and ionic strength of the organic ions to be collected, the solubility of the reaction products of the organic ion and the collector and the pH of the solution. The collector ions have electrical charges which range from relatively weak to relatively strong, depending upon such factors as the extent of solvation and the electronegativity of the rest of molecule. The strength of the charge, among other things, tends to govern, to some extent, the rate of reaction between the collector ions and the ions to be collected. This fact can be utilized to aid in separation of one ion from others in the solution.

The solubility of the insoluble reaction products depends upon the branching and chain length of the hydrophobic (aerophilic) chain of the collector and the ion being removed. This fact can be utilized to remove one ion by flotation while another ion remains in solution.

Should the ion to be collected exist only as a cation, the situation is complicated by the fact that the collector has to be anionic and such collectors are, for the most part, salts of weak acids and therefore tend to hydrolyze to the insoluble fatty acids in acid solution though the fatty acids could be made into stronger acids by adding electronegative substances such as chlorine or —SO$_3$H to the long chain hydrocarbon. Generally the long chain alkyl sulfonates are sufficiently strong acids to be usable in dilute acid solutions and must be utilized at pH's where fatty acids are insoluble.

When the insoluble reaction products being recovered as a froth are about the same color, a small amount of an organic dye can sometimes be used as a "marker" where the dye has properties which would render it collectable after the collection of one ion and before the second ion is recovered. In such a procedure, the first froth would be segregated from the marker froth or scum having a differing color which scum would be then segregated from the froth or scum of the later collected material.

My examples described, for the most part, the recovery of dyes from solutions. The dyes disclose readily the operability and effectiveness of my process without requiring excessive analytical procedures. The dyes also contain a multiplicity of reactive ionizable groups. For example, methyl orange contains sulfonyl and tertiary amine radicals; phenolphthalein contains alcohol, anhydride, ketone (enol), and carboxyl groups in its various forms; methyl violet in the cannonical form contains a quaternary nitrogen group. Naphthol green B contains sulfonyl, keto and nitroso groups; acid leather brown EGB contains nitro, sulfonyl and keto groups. The procedure utilized for the recovery of these compounds can also be used for recovering other nonprotein organic compounds having ionizable groups.

It is not intended that my invention be restricted to the exact steps, concentrations, reagents or ions collected. Rather, it is intended that all equivalents be included within the scope of my invention as claimed.

EXAMPLE I

A recovery apparatus was prepared consisting of a funnel having an 8.4 cm. diameter sintered glass bottom plate. The funnel was fitted with a rubber collar which was shaped to provide a runoff trough to facilitate collection of the scum bearing froth. Air was passed, when desired, through the bottom of the funnel at a rate sufficient to insure a well distributed column of bubbles and at a rate insufficient to cause undue turbulence at the surface of the solution. Congo red dye was dissolved in 450 mls. of distilled water. The solution was adjusted to a desired pH prior to the time the dye was introduced into the flotation apparatus described above. A measured amount of lauryl pyridinium chloride was heated in absolute ethanol at boiling for one minute and then added to the solution in the cell. The mixture was stirred slightly to insure proper distribution of the lauryl pyridinium chloride and air was introduced into the flotation cell. The collection time varied with the change in pH as did the amount of froth. The following table sets out initial and final pH's of the aqueous solution, the amount of collector utilized and the color of the solutions, froths and scums:

| pH Initial | Collector Amt. (gms.) | Collection Time (min.) | pH Final | Remarks |
|---|---|---|---|---|
| 6.0 | .012 | 2 | 6.0 | Light bubbly froth, some red scum, cell light red in color. |
| 3.0 (HCl) | .012 | 2 | 3.1 | No froth, black scum, cell red. |
| 3.9 (HCl) | .012 | 3 | 3.8 | Slight froth, red scum, cell clear. |

EXAMPLE II

Utilizing the apparatus and procedure of Example I, phenolphthalein was recovered from solution under conditions noted in the following table:

| pH Initial | Collector Amt. (gms.) | Collection Time (min.) | pH Final | Remarks |
|---|---|---|---|---|
| 9.7 (NaOH) | .012 | 1 | | No scum, voluminous froth, cell dark red. |
| 8.5 (NaOH) | .020 | 1½ | 6.7 | White scum, moderate froth, cell clear although additional NaOH returned red color. |

EXAMPLE III

Utilizing the apparatus and following the procedure of Example I, methyl orange was collected from solution under conditions set out in the following table:

| pH Initial | Collector Amt. (gms.) | Collection Time (min.) | pH Final | Remarks |
|---|---|---|---|---|
| 5.4 | .016 | 4 | 5.5 | Initial froth bed broke after two minutes to produce yellow scum, cell slight golden color. |
| 3.4 (HCl) | .016 | 4 | 3.5 | Heavy froth with little yellow scum, cell lighter in color. |
| 8.6 (NH$^4$OH) | .016 | 4 | 7.9 | Heavy froth broke after two minutes with yellow scum over, cell slight golden yellow. |
| 5.5 | .016 | 4 | 5.7 | Same as above. |
| 5.8 | .02 | 4 | 5.8 | Heavy froth broke after two minutes with yellow scum over, cell clear. |
| 5.8 | .016 | 2 | 5.7 | 300 ml. soln., cell golden yellow, froth broke quickly with yellow scum collected. |

EXAMPLE IV

Utilizing the apparatus and following the procedure of Example I, methyl violet was collected from the solution, by utilizing the collector α-sulfolauric acid under the following conditions:

| pH Initial | Collector Amt. (gms.) | Collection Time (min.) | pH Final | Remarks |
| --- | --- | --- | --- | --- |
| 3.2 (HCl) | .012 | 4 | 3.3 | Dark metallic scum, adhered to cell, cell faint purple cast. |
| 5.5 | .016 | 4 | 4.2 | Same as above. |
| 3.3 (HCl) | .016 | 4 | 3.5 | Dark metallic scum, adhered to cell, cell clear. |
| 8.5 (NH4OH) | .016 | 4 | 6.4 | Dark metallic scum, difficult to collect, cell purple. |

EXAMPLE V

Utilizing the apparatus and following the procedure of Example I, methyl orange was collected from the solution, by utilizing the collector lauryl pyridinium chloride under the following conditions:

| pH Initial | Collector Amt. (gms.) | Collection Time (min.) | pH Final | Remarks |
| --- | --- | --- | --- | --- |
| 6.2 | .016 | 8 | | 1st addition—easily collected red scum. |
| | .02 | 8 | 6.4 | 2nd addition—yellow scum, cell clear. Heavier froth in 2nd case, but controllable. |

EXAMPLE VI

Aqueous solution containing 0.008 gm./l. of Lauth's violet was made up and the indicator converted to the ion form with ammonia. Sufficient lauryl pyridinium chloride was added to the solution to form a collector concentration of 0.03 gm./l. Air bubbles were sparged through the solution and the deep blue froth removed until the solution was water white.

EXAMPLE VII

A .008 gm./l. aqueous solution of methyl yellow was acidified to pH 3.0 with dilute hydrochloric acid. At this pH, after addition of sufficient α-sulfolauric acid to form collector concentration of 0.03 gm./l., air was bubbled continuously through and a cerise colored product floated from solution. A similar solution of methyl yellow was contacted with lauryl pyridinium chloride but was not floated to any appreciable extent. From this result it appears that methyl yellow is cationic in acids.

EXAMPLE VIII

A dilute solution of methyl yellow was adjusted to pH 9.0 with ammonia. Air was bubbled continuously through the solution. At this pH the dye was completely floated as a yellow froth by the addition of 0.03 gm./l. lauryl pyridinium chloride. Methyl yellow is not floated by α-sulfolauric acid under these conditions and therefore appears to be anionic in bases. The results obtained in Examples VII and VIII indicate that methyl yellow is amphoteric in character.

EXAMPLE IX

A froth containing azoalizarine yellow was floated by adjusting the pH of an aqueous solution containing 0.08 gm./l. of dye to pH 9.0 with sodium hydroxide, adding 0.03 gm./l. lauryl pyridinium chloride to the solution and bubbling air up through the solution.

EXAMPLE X

A solution of azoalizarine yellow similar to that of Example IV was adjusted to pH 5.0 with hydrochloric acid. α-sulfolauric acid would not float the dye when air was bubbled through the solution.

EXAMPLE XI

An aqueous solution containing 0.08 gm./l. methyl violet was adjusted to pH 3.0 with hydrochloric acid. Air was bubbled continuously through the solution. On the addition of 0.03 gm./l. α-sulfolauric acid, a colored froth formed on the surface as the dye was removed from the solution which became water white after about ten minutes.

EXAMPLE XII

A solution of 0.08 gm./l. methyl orange and 0.08 gm./l. Congo red in water was adjusted to pH 8.0 with ammonia. Air was bubbled through the solution and 0.02 gm./l. lauryl pyridinium chloride added. The Congo red floated as a froth while the methyl orange remained in solution. It is to be noted that Congo red has two reactive —$SO_3H$ groups while methyl orange has only one.

EXAMPLE XIII

The dye Lauth's violet collected with α-sulfolauric acid can be dissolved in a non-polar solvent, such as benzene and extracted with a concentrated mineral acid. The dye passes into the acid solution leaving the α-sulfolauric acid in the non-polar solvent. The collector can be removed from the solvent and utilized to recover more of the dye.

EXAMPLE XIV

The following dyes were made up into 400 mls. aqueous solution containing 3 mgs. each of Congo red, methyl orange, phenolphthalein and Lauth's violet. This solution was made slightly alkaline with ammonia. A solution containing 22 mgs. of lauryl pyridinium chloride per ml. of absolute alcohol was added, 1 ml. at a time, while air was sparged through the solution. Congo red was floated prior to methyl orange which was floated, in turn, prior to phenolphthalein. Lauth's violet is cationic and, as a result, was not floated.

EXAMPLE XV

Portions, 3 mg. each, of potassium indigo sulfonate, Congo red, methyl orange, bromphenol blue and phenolphthalein were made up into a 400 ml. aqueous solution. The solution was made slightly alkaline with ammonia and air was passed through the solution. A lauryl pyridinium chloride solution similar to that of Example XIV was added to the dye solution 1 ml. at a time. The dyes were floated in the above set out order and the distinctive color of each was clearly perceptable in the froth at each stage. About 1 ml. of collector solution was required to float each dye, so, after addition of about 7 mls. of collector, the solution was completely colorless.

EXAMPLE XVI

The scummy froth obtained from floating Lauth's violet with α-sulfolauric acid was dissolved in benzene and washed with water. The benzene solution was extracted with concentrated hydrochloric acid. The dye was recovered from the concentrated acid and the benzene evaporated from the α-sulfolauric acid which was then suitable for recovering other ions.

EXAMPLE XVII

Froth formed when methyl orange was floated utilizing lauryl pyridinium chloride as the collection agent was dissolved in absolute alcohol, forming a deep orange solution. Alcoholic potassium hydroxide was added to the solution to precipitate the potassium salt of methyl orange. The lauryl pyridinium chloride remained in the absolute alcohol and could be used, as such, in the recovery of other organic ions from polar solutions.

EXAMPLE XVIII

Methyl orange was floated according to a procedure similar to that of Example I utilizing lauryl amine chloride in an almost neutral solution. The froth was dissolved in absolute alcohol and alcoholic potassium hydroxide added. After standing, the solution was diluted with water and shaken with benzene. The lauryl amine went into solution in the benzene phase while the dye remained in the aqueous phase.

EXAMPLE XIX 0.2 gm. of brucine was dissolved in HCl and made up to 400 ml. with distilled water. $\alpha$-sulfolauric acid was dissolved in alcohol and added to the solution and air bubbled through. The rate of air flow was adjusted so that new froth was formed at the same rate as the previous froth collapsed. There was visible loading of the froth with reaction product. After ten minutes, the froth was skimmed off and tested for brucine with concentrated sulfuric acid to which a speck of dichromate had been added. An intense chocolate color, much darker than given by the mother liquor, proved concentartion in the froth.

EXAMPLE XX

Using the procedure of Example XIX, strychnine was recovered as a deep violet reaction product.

EXAMPLE XXI

A 0.1 gm. portion of picric acid was dissolved in 400 ml. of distilled water and adjusted to pH 8 with ammonia. Arquad 12/50 (an alkyl quaternary ammonium chloride containing 90% dodecyl as the alkyl substituent, produced by Armour and Company of Chicago, Illinois) was utilized to remove the picric acid from solution as a bright yellow scum over a five minute period. The scum was dissolved in alcohol and, on the addition of potassium hydroxide, a deep yellow crystalline precipitate of potassium picrate was obtained.

EXAMPLE XXII

A 0.2 gm. portion of gallic acid was dissolved in 400 ml. of distilled water, and the pH adjusted to 8 with ammonia. Duomeen C (N - alkyltrimethylenediamines, derived from coconut fatty acids, produced by Armour and Company of Chicago, Illinois) dissolved in alcohol was introduced into the solution as air was sparged into the solution. After five minutes, the froth was collected and dissolved in alcohol. On the addition of alcoholic potassium hydroxide, a red, somewhat sticky precipitate of potassium gallate was obtained.

EXAMPLE XXIII

A 0.5 gm. portion of sodium tetraphenyl boron was dissolved in 400 ml. of distilled water. Armeen C. (N-primary amine derivatives of coconut fatty acids produced by Armour and Company of Chicago, Illinois) dissolved in alcohol was utilized as a collector. A scum was obtained on bubbling air through this solution. The collected scum rapidly coagulated to the consistency of chewing gum, shedding all water. On dissolution of the insoluble reaction product in alcohol, and on the addition of alcoholic potassium hydroxide a voluminous off-white precipitate of the potassium salt of tetraphenyl boron was immediately formed.

EXAMPLE XXIV

To recover choline chloride from solution, sodium dodecyl benzene sulfonate is utilized as a collector in the process of Example I.

EXAMPLE XXV

To test my process in a clarification procedure, sugar that had been charred to a black molasses was dissolved in water to form a dirty brown solution. Utilizing Arquad 12/50 as a collector, the coloring matter was floated into the froth, leaving the solution so faintly colored that it was barely discernable.

EXAMPLE XXVI

Rosinduline is recovered from water by the sodium salts of sulfated fatty alcohols known as Teepols as a red scum.

EXAMPLE XXVII

Naphthol Green B is dissolved in water and the pH adjusted to 8 with ammonia. Lauryl pyridinium chloride is added to the solution as a collector and the dye collected in the froth resulting when methane is bubbled through the solution.

EXAMPLE XXVIII

Acid leather brown EGB is dissolved in water and the pH adjusted to 8. Arquad 12/50 is added to the solution as a collector and the dye is collected in the froth when carbon dioxide is bubbled through the solution.

EXAMPLE XXIX

To a solution of less than 1 mg. abietic acid in 1 liter of solution at pH 2 is added the stoichiometric amount of didodecyl dimethyl ammonium chloride, prepared by evaporating an ethyl acetate solution to dryness, and then dissolving the residue in 1 ml. of propyl alcohol. After bubbling in air for 1 hour, the scum is collected.

EXAMPLE XXX

To recover 2-acetyl-4-bromo-1-naphthol from solution, ethyl xanthate is slowly added to an aqueous or alcohol solution of the desired ion. Methane, carbon dioxide or nitrogen is bubbled through the solution to collect the insoluble product as in previous examples.

EXAMPLE XXXI

The compound 4-(2-furyl)-3-butene-2-one is recovered from solution in acetonitrile made basic with pyridine by sparging nitrogen through the solution and introducing lauryl picolinium chloride.

Many processes are known for ionizing organic compounds which are floated with great difficulty. It will be apparent to one skilled in the art that superior ion collection coupled with the small amount of flotation taking place with these ions can convert an otherwise uneconomical process to a more economical process.

It is apparent from the specification and the above examples that many species of the process of my invention can be utilized in organic ion recovery processes. It is manifestly impossible for the applicant to comprehend within his disclosure all of these species. To formulate a set of specific conditions for the recovery of a specific ion requires chemical knowledge and skill, but such knowledge on the part of the flotation chemical engineer is that of the architect who, when required to design a house, prescribes the proper materials and dimensions thereof. From his knowledge, as a chemist or chemical engineer, of the materials available and the known solubilities of materials and from his knowledge of the theories of solubility based on known solubilities, he will deduce with confidence the applicability of various materials to my process and will be able to fit unmentioned collector and organic ions into my process by routine testing of the reaction product solubilities at various pH's and concentrations. Analogously, in the construction of a house, the architect can easily test the load bearing capacity of new and little used materials as being inoperative, impractical or uneconomic for his purposes. It is safe to assume that no one would want to carry out a useless specie of my invention or that anyone will be mislead because it is possible to misapply the teachings of my invention.

Now, having described my invention, what I claim is:

1. A process for the recovery of organic non-protein ions from a polar solution thereof by a technique wherein a unique flotable reaction product is formed and separated by froth flotation, comprising contacting said organic ions while in said polar solution with an oppositely-charged, ion-producing, surface-active collector having at least one hydrophilic and one aerophilic center of activity, said collector being selected from the group consisting of alkyl, aryl-, arylalkyl-amines and the corresponding amine salts and quaternary ammonium halogen salts, and a triglyceride derivative selected from the group consisting of plant and animal triglycerides having from 5 to 24 carbon atoms in each of its aerophilic centers of activity at collector concentrations below the critical micelle concentration of said collector, to form a reaction product, said reaction product being of a monomolecular nature capable of adsorption at the interface of an air bubble by reason of the aerophilic activity of said collector, buoying the reaction product with air bubbles to form a froth on the surface of the solution while maintaining said surface substantially quiescent, removing the froth, and recovering the reaction product therefrom 2. The process of claim 1 wherein the polar solution is an aqueous solution.

3. A process for the recovery of organic non-protein ions from a polar solution thereof by a technique wherein a unique flotable reaction product is formed and separated by froth flotation, comprising contacting said organic ions while in said polar solution with an oppositely-charged, ion-producing, surface-active collector having at least one hydrophilic and one aerophilic center of activity, said collector being selected from the group consisting of alkyl-, aryl-, arylalkyl-amines and the corresponding amines salts and quaternary ammonium halogen salts, and a triglyceride derivative selected from the group consisting of plant and animal triglycerides having from 5 to 24 carbon atoms in each of its aerophilic centers of activity at collector concentrations below the critical micelle concentration of said collector, to form a reaction product, said reaction product being of a monomolecular nature capable of adsorption at the interface of an air bubble by reason of the aerophilic activity of said collector, buoying the insoluble reaction product with air bubbles at a bubble size and flow rate such that the surface of the solution remains quiescent whereby rising bubbles remain substantially intact when they break the surface of the liquid, removing froth, and recovering the reaction product therefrom.

References Cited by the Examiner

UNITED STATES PATENTS

| | | | |
|---|---|---|---|
| 1,483,270 | 2/1924 | Barrows | 209—166 |
| 1,619,036 | 3/1927 | Ravnestad | 210—44 |
| 2,921,678 | 1/1960 | Fuchsman | 209—166 |
| 2,953,569 | 9/1960 | Last et al. | 209—166 X |

OTHER REFERENCES

Dognon Revue Scientifique: pages 613–619, vol. 79, 1941.

Gaudin "Flotation" 2nd Ed.: 1957 publ. by McGraw-Hill Book Co., N.Y., pp. 185–187, 217–221 and 336–337 and 554 relied on.

Magoffin et al.: Fundamental Properties of Textile Wastes, VIII.

The Flotation of Colloidal Suspension: Textile Research, vol. 8, August 1938, pp. 357–363.

Surface Active Agents and Detergents: by Schwartz et al. II, Interscience Publishers, Inc., New York, vol. II, 1958, pages 716 and 626–631.

Surface Active Agents: by Schwartz et al. I, Interscience Publishers, Inc., New York, 1949, pages 151–434 and 489–494.

MORRIS O. WOLK, *Primary Examiner.*

CARL F. KRAFFT, EARL M. BERGERT, *Examiners.*